VIDEO AMPLIFIER CONTROL BY COMBINED
A.G.C. AND D.C. VOLTAGES
Filed Nov. 30, 1950
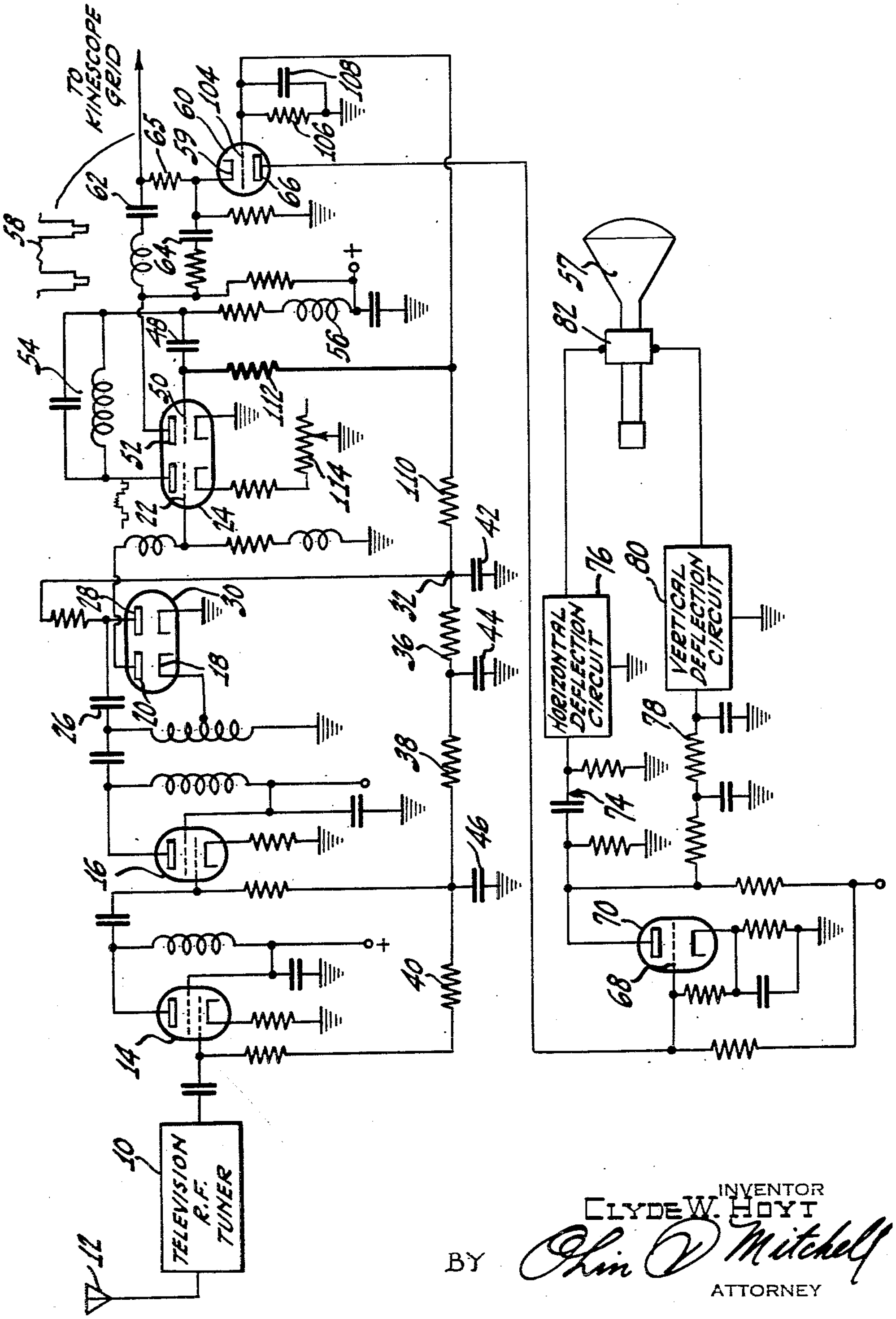
INVENTOR
CLYDE W. HOYT
BY Olin V Mitchell
ATTORNEY

United States Patent Office 2,698,358
Patented Dec. 28, 1954

2,698,358

VIDEO AMPLIFIER CONTROL BY COMBINED A. G. C. AND D. C. VOLTAGES

Clyde Warren Hoyt, Pennsauken, N. J., assignor to Radio Corporation of America, a corporation of Delaware Application November 30, 1950, Serial No. 198,373

3 Claims. (Cl. 178—7.5)

The present invention relates to improvements in radio receiving systems of the type adapted to receive and demodulate composite intelligence signals having a synchronizing component represented by high amplitude variations with lower amplitude variations representing another type of information and relates more directly although not necessarily exclusively, to radio receivers adapted to receive and demodulate television signals of the type now utilized in commercial television broadcasting.

In more particularity, the present invention relates to improvements in circuit techniques and processing of standard broadcast television signals so as to improve the precision with which the synchronizing component and the video component of these signals are separated.

The present invention further relates to improvements in the design in manufacture of television signal receiving circuits so as to allow a greater dynamic range of television signal amplitudes and brightness changes to be successfully received and reproduced.

More directly, the present invention relates to an improvement in the television receiving system shown and described in a copending U. S. application Ser. No. 198,371 filed November 30, 1950, by C. W. Hoyt and L. P. Thomas and titled "Television Receiving Systems." As pointed out in the above identified copending U. S. patent application there is a great demand for low cost precision signal processing in the manufacture and design of television receivers. It is well known by those skilled in the art that present day television receivers must be capable of receiving and processing a standard television signal which comprises two main portions. These two portions are distinguishable from one another in both waveform and amplitude.

These portions are usually called the synchronizing component and the video component. It is the purpose of the synchronizing component to maintain synchronism between the television transmitter image scanning device and the television receiver signal reproducing device so that the picture elements defined by the transmitter will be properly positioned in the television receiver picture raster. The video component, representing lower amplitude variations, of course represents the brightness of each element in the picture as scanning at the transmitter and reproduction at the receiver takes place.

In order to prevent interference between the video component and the synchronizing component at the receiver it is necessary, in the processing of the television signal to separate these components one from the other. This is most commonly done on an amplitude basis. Synchronizing information being pulse like in form generally represents 100 percent of the amplitude of the television carrier while peak video information seldom rises above 75 percent of the amplitude of the television carrier. The basic system of amplitude separation of the synchronizing component of the television signal is beset by a number of problems when subjected to variations in the amplitude of the signal as received by the receiver, these variations being caused by interference, fading, etc.

In order to minimize the effects of signal fading on synchronizing signal separation in television receivers, as well as the visual effects of fading on the reproduced image, automatic gain control circuits are now in wide use. These circuits generally sample the amplitude of the demodulated television signal and control the gain of the receiver in a manner which is inversely proportional to the increase or decrease of the demodulated signal above or below a predetermined standard. However, unless considerable expense is tolerated these automatic gain control circuits are not perfect in their action, especially under conditions of extremely low signal strengths and extremely high signal strengths. The basic amplitude discriminatory or threshold device used as a synchronizing signal separator although being supplied with the AGC regulated signal will tend, with the imperfect action of the AGC circuit, to provide insufficient sync at low level signals (along with excessive noise) while producing too deep a signal separation at high level signals thereby tending to include some video information along with the separated sync.

Another disadvantageous effect commonly present in television receivers even though equipped with automatic gain control circuits, is that of overload of the kinescope and distortion of synchronizing waveform as a result of large changes in picture brightness. This is especially true when receiving high level television signals. If the contrast control of the television receiver has been set for rather low level picture brightness so as to produce suitable contrast, a very marked degree of increase in picture brightness may produce blooming of the kinescope electron beam as well as overloading of certain circuits handling the video signal and its associated synchronizing component.

The above problems, however, have been quite satisfactorily met through the arrangement disclosed in the above identified patent application by Hoyt and Thomas. In this arrangement use is made of a sync separator circuit having a controllable threshold which permits the amplitude level below which the separator circuit will not pass signals to be controlled. This threshold level is then controlled as a joint function of the television signal amplitude received by the receiver and the D. C. picture information or average brightness of the scene. The arrangement in the above identified application further discloses the use of an automatic gain control circuit to derive the aforementioned information as to amplitude of the received television signal. Overload compensation is then provided by supplementing the automatic gain control voltage applied to the television signal IF amplifiers of the receiver by a small amount of D. C. picture information. Thus in the above identified case over which the present invention is an improvement the sync separator clipping threshold and the automatic gain control voltage of the television receiver are made a function of average brightness and the peak amplitude of the received television signal.

However, in addition to the above television reception problems there exists a particularly troublesome one which arises when an attempt is made to employ A. C. coupled video amplifiers for amplifying a television signal after demodulation from the carrier. In such cases it is frequently found that rapid increases in the received signal level through the video amplifier due either to increased signal strength or an increase in the contrast setting of a television receiver, will cause deterioration of the synchronizing signal waveform due to grid current in one or more of the A. C. coupled amplifier stages. Furthermore, the time constants for the RC circuits used in coupling video amplifiers must be rather long to permit proper transmission of low frequency video information. This sometimes permits excessive grid current charging of the coupling capacitors in the presence of noise peaks which may require considerable time before full recovery to normal amplifier operation can be made. Heretofore in the art then, it is apparent that unless rather expensive and complicated D. C. restorer circuits were used so as to properly regulate the bias on one or more video amplifier stages the performance of such a television receiver might be greatly compromised.

It is therefore a purpose of the present invention to provide an improved video amplifier and synchronizing signal separator circuit for television receivers which will minimize the effects of signal strength variations on the character of the synchronizing signal separated.

It is another object of the present invention to provide an improved television receiving system which permits the successful use of A. C. coupled video amplifier stages without suffering a decrease in the dynamic range of the signal amplitudes successfully capable of reception by the television receiver.

In the realization of the above objects and features of advantage the present invention contemplates the use of a video amplifier stage which includes an electron discharge tube whose control electrode and cathode are biased relative to one another by means of a control voltage which in one form of the present invention may represent the average brightness of the received television signal, while in another form of the invention the control voltage may represent both brightness information and signal intensity information.

A more complete understanding of the present invention as well as a fuller appreciation of its objects and features of advantage will be obtained through a reading of the following description especially when taken in connection with the accompanying single figure of the drawing in which is shown a combination schematic and block diagram representation of one embodiment of the present invention as applied to a preferred form of television receiving circuit.

Turning now to the drawing there is shown a television RF tuner 10 adapted to receive radio frequency television signals from the antenna 12. The RF tuner 10 includes conventional superheterodyne circuits well known in the art. The RF tuner is of course followed by IF amplifiers 14 and 16. The plate of IF amplifier 16 is coupled to the cathode 18 of the detector diode 20 which produces demodulated signals having a D. C. picture component (average brightness information) present. This video signal is coupled to the grid 22 of the first video amplifier 24 for amplification thereby.

The output of the IF amplifier 16 is also coupled by capacitor 26 to the anode 28 of the AGC diode 30. The AGC voltage appearing at terminal 32 is applied via the filter comprising resistors 36, 38, 40 and capacitors 42, 44 and 46 to the control electrodes of the IF amplifiers 14 and 16. This tends to maintain the signal level applied to the detector diode 20 constant in the face of small variations in the intensity of the received signal.

The output of the video amplifier 24 is capacitively coupled via capacitor 48 to the grid or control electrode 50 of the second video amplifier 52. A conventional high frequency compensating network 54 as well as inductance 56 imparts to the first video amplifier suitable frequency response. The video signal 58 appearing at the output of the video amplifier 52 is suitably coupled to the control grid of the kinescope 57 and also to the cathode 59 of the sync separator triode 60. The signal to the sync separator triode 60 as well as to the kinescope is coupled by way of capacitors 62 and 64. Resistance 65 is made relatively large so that the only part of the signal reaching the cathode 59 is attributable to the capacitive coupling of the condenser 64.

The anode 66 of the sync separator triode 60 is suitably coupled to the grid 68 of a sync amplifier tube 70. The output of the sync amplifier 70 is then applied through a differentiating network 74 to the horizontal deflection circuit 76 and also through integrating network 78 to the synchronizing terminal of the vertical deflection circuit 80. The outputs of the vertical and horizontal deflection circuits are of course coupled to a deflection yoke 82 serving to deflect the electron beam within the kinescope 57. The automatic gain control action as well as the operation of the detector arrangement shown in the drawing is described in a book entitled "Radio Set and Service Review" appearing in the Radio Electronics Magazine, for November, 1950, between pages 34 and 36.

According to the arrangements disclosed in the above identified copending U. S. patent application an improved sync separating action and an increased useful dynamic range of the receiver as achieved through the connection of the sync separator tube grid 104 (tube 60) with ground through the parallel combination of resistance 106 and capacitor 108. The above copending U. S. patent application also discloses the connection between the grid 104 of the sync separator tube and the AGC bus of the television receiver through the resistor 110.

With such an arrangement, should the incoming signal to the television receiver increase in amplitude, the AGC voltage applied to the AGC bus will swing in a negative direction so as to decrease the gain of IF amplifiers 14 and 16. Under normal conditions however, this reduction in gain does not completely regulate the amplitude of the signal applied to the cathode of the sync separator tube 60. Hence part of the negative going AGC voltage is communicated to the grid 104 of the sync separator tube so as to cause the sync separator tube to defer conduction until the video signal applied to the cathode 59 swings the cathode more negatively than previously necessary for such conduction. This prevents peaks of the now greater amplitude video signal from getting into the separated sync. The reverse action of course occurs in the event of a decrease in received signal level. The AGC bus potential will then swing in a positive direction and the sync separator tube 60 will conduct at lower levels of negative potential. All voltage swings herein described are referenced to ground or such a fixed voltage datum terminal.

According to the present invention however, the control electrode of the video amplifier 52 instead of being returned through resistor 112 to a fixed potential such as for example ground, the lower terminal of resistor 112 is connected to the right hand terminal of resistor 110. The pronounced advantages of this novel connection become clear from an analysis of operation.

It is first expedient to consider what happens in prior art arrangements in which the resistor 112 is connected, as mentioned above, to a fixed datum potential such as ground. The positive going sync peaks of the signal 58 applied to the grid 50 will then tend to cause grid current conduction. This will of course charge up the coupling capacitor 48 so as to maintain some negative bias on the grid 50 relative to its cathode. Should the incoming signal become rapidly greater in intensity due to return from a deep fade, the peak of sync may be noticeably damaged by the grid current that results. This destruction in waveform will of course tend to cause missynchronization of the deflection circuits in the receiver and will adversely effect picture stability.

In accordance with the present invention no grid current is permitted to be drawn by the grid 50 during normal sustained operating conditions. Should the signal increase in amplitude the negative voltage developed by grid 104 of the sync separator tube 59 will increase and hence the bias on grid 50 will change in a more negative direction relative to its cathode. This will tend to prevent grid current from being drawn in the video amplifier tube 52. Again should the signal applied to the sync separator decrease the average potential appearing at the grid 104 of the sync separator tube will become more positive. This of course is according to the present invention, communicated to the grid 50 of the video amplifier tube so as to increase its gain, still without the positive going sync peaks of the grid 50 causing grid current conduction.

It is seen from the above that the present invention has utility without the need of its connection, as shown in the drawing, with an automatic gain control system. This follows since the contrast control 112 located in the cathode circuit of the first video amplifier 24 will in itself produce, when adjusted, the above mentioned variations in signal levels and thus burden sync separator action. Furthermore, changes in average picture brightness will cause the peak to peak value reaching the sync separator tube 60 to vary. However, with the connection of grid 50 through resistance 112 to a potential which varies not only in accordance with an average picture brightness but also in accordance with the peak intensity of the received signal enhanced regulating action is obtained.

With AGC action the operation is as follows: Should the received signal become greater in intensity the AGC voltage developed at terminal 32 will become more negative. This in turn will swing the grid 50 of the video amplifier 52 in a negative direction so as to prevent peaks of received sync from causing grid current conduction in the tube. Should the average signal strength as detected by the receiver decrease, the AGC potential at terminal 32 will become more positive. This will increase the gain of the receiver not only by merit of increased IF gain but also by merit of increased video amplifier gain. It is, of course, seen that due to the bias regulating action on the grid of the video amplifier 52 peaks of noise will have less tendency to "set up" a false negative bias on the grid 50.

From the foregoing it is seen that the applicant has provided a new and useful arrangement for processing television signals although in no way limited to the particular embodiment shown in the drawing is in particular useful application in receiving circuits employing automatic gain control circuits.

Having thus described my invention what I claim is:

1. In a television receiving system the combination comprising: Means for receiving and demodulating a signal carrying a composite television signal which includes at least a relatively high amplitude synchronizing signal component and a relatively low amplitude video component, the relationship between which components defines a direct current picture brightness component; a video amplifier circuit coupled to the output of said receiving means, said video amplifier circuit including a discharge tube having at least an anode, cathode and control electrode; an amplitude discriminatory synchronizing signal separator circuit having its input connected with the output terminals of said video amplifier; a first video signal responsive means coupled with said video amplifier circuit for developing from a video signal supplied thereby a filtered unidirectional potential representing said picture brightness component; a second signal responsive means coupled with the output of said receiving means for developing a filtered unidirectional potential representing the amplitude of the synchronizing signal component; means for combining the outputs of said first and second signal responsive means to produce a control voltage; and direct current conducting impedance means connected from the output of said last named means to said video amplifier control electrode and cathode whereby the grid-cathode potential of the discharge tube in said video amplifier is rendered a joint function of synchronizing signal amplitude and brightness components.

2. Apparatus according to claim 1 wherein said synchronizing signal separator circuit is of the variable threshold type and wherein there is additionally provided means connected with said sync separator and said combining means for varying the threshold on said sync separator in accordance with said control voltage.

3. In a television receiving system the combination comprising: means for receiving and demodulating a modulated television radio carrier to produce a composite television signal which includes a high amplitude synchronizing component and a relatively low amplitude video component, the relationship between portions of said components defining a direct current picture brightness component; a video amplifier comprising an electron discharge tube having at least a control grid, cathode and anode; means connected with said receiving means and said control grid for alternating current coupling said grid to said receiving means such that no direct current picture brightness component is present at said grid; means coupled with said anode for driving connection of said amplifier with a picture reproducing tube; means coupled with a portion of said receiving means and responsive to received television radio carrier representations to produce a filtered unidirectional potential representing the amplitude of said synchronizing component; means for producing a filtered unidirectional potential representing the direct current picture brightness component of a video signal; means coupling said latter means to the output of said discharge tube anode; means connected with said last two named means for combining at its output said unidirectional potentials to produce a single control potential representing both said synchronizing component and said brightness component; and a resistor connected from the output of said combining means to said discharge tube control grid for controlling the bias on said tube as a function of said control potential.

References Cited in the file of this patent

UNITED STATES PATENTS

| Number | Name | Date |
|---|---|---|
| 2,240,490 | Cawein | May 6, 1941 |
| 2,304,713 | Smith | Dec. 8, 1942 |
| 2,356,141 | Applegarth | Aug. 22, 1944 |
| 2,481,045 | Schroeder | Sept. 6, 1949 |
| 2,606,247 | Fyler | Aug. 5, 1952 |

OTHER REFERENCES

"Rider's Television Manual," vol. 4, Packard-Bell T. V., pages 4–27, November 25, 1949.